H. NADERMANN.
FRUIT AND JELLY PRESS.

No. 176,475. Patented April 25, 1876.

Attest

Inventor
Henry Nadermann
by
Hatch & Parkinson
Attys.

UNITED STATES PATENT OFFICE.

HENRY NADERMANN, OF CINCINNATI, OHIO.

IMPROVEMENT IN FRUIT AND JELLY PRESSES.

Specification forming part of Letters Patent No. 176,475, dated April 25, 1876; application filed February 18, 1876.

*To all whom it may concern:*

Be it known that I, HENRY NADERMANN, of Cincinnati, in the county of Hamilton and State of Ohio, have invented certain Improvements in Fruit and Jelly Presses, of which the following is a specification:

My invention relates to hand-presses for fruit, &c., and consists in a peculiar formation of the pressure-head or follower; in a perforated bottom to the press; in such a construction of the handle-socket that the handle cannot twist therein; in a latch to hold the cylinder in place; in the combination and specific construction of these parts; in the construction of the expansible nut and its socket, which form the subject of the Letters Patent granted me August 24, 1875; and in the press embodying these parts as a whole.

Figure 1:
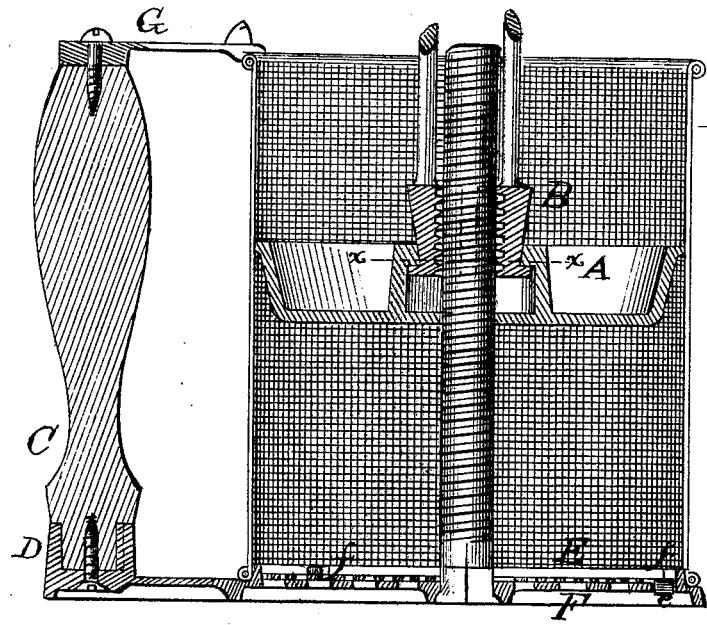
Figure 2:
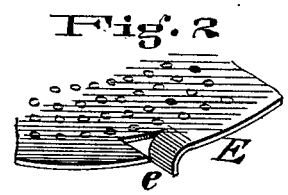
Figure 3:
Figure 4:
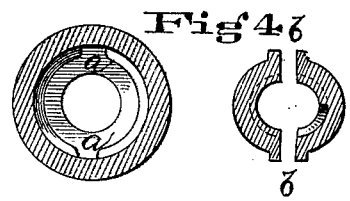
Figure 5:
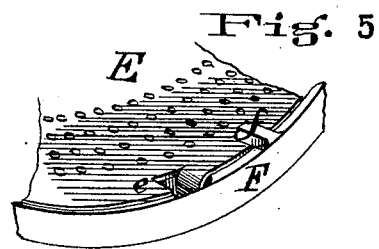

Figure 1 is a vertical section through the press. Fig. 2 is a portion of the strainer on the bottom of the cup; Fig. 3, a horizontal section through the handle and its socket; Fig. 4, a section through the expansible nut and its socket, taken on the line $x\,x$ in Fig. 1; Fig. 5, a view showing the method of securing the strainer on the bottom plate in place.

In Fig. 1, A is the follower, constructed in the form of a cup or pan, with inclined sides, thus giving the follower the form of a conical frustum, with the base upward, as shown, for the purpose of more perfectly pressing out the juice at the sides by means of the wedge-shaped space between the follower and the cylinder, into which the mash is forced by the descent of the follower. This latter is made hollow, or in the form of a cup, for lightness, and also to catch any stray juice that comes up around its edges. The socket on the follower is constructed as shown in Fig. 1, the flange on the lower edge of the nut passing below that on the socket when the parts of the nuts are squeezed together. The nut also has projections $b\,b$, Fig. 4, to prevent its withdrawal from the socket when not expanded, the flange on the socket being cut away at $a\,a$, Fig. 4, to permit the passage of these projections. The socket D on the base-plate, for the reception of the handle, is provided with a projection, $d$, Fig. 3, which acts as a key when the handle is in place, and prevents it twisting in its socket when the pressure-head is screwed down. The same effect may be secured by making the socket square or polygonal; but I prefer the form shown, it being cheaper. The bottom F of the press is perforated, so that the juice can flow through it, and is provided with a strainer, E, Figs. 2 and 3. The bottom F has lugs $f\,f$ on it, projecting inwardly, and the strainer E is inserted under these lugs. It is easily inserted under all but one, and is brought under that one by means of a cut, $e$, the metal of the strainer being bent down, (see Fig. 2,) and projecting into one of the perforations of the bottom, (see Figs. 1 and 6,) thus preventing the strainer from turning and bringing the space $e$ opposite one of the holes in the bottom, and allowing the mash to escape. At G is a latch attached to the handle for holding the cylinder down. As shown in Fig. 1, it is in position, engaging the cylinder and holding it in place. When it is desired to remove the cylinder, the latch is turned aside and the cylinder taken off. The perforated bottom permits the use of a solid cylinder. A perforated follower furnished with a strainer may be used with a solid bottom and cylinder, so that the juice will flow up through it and remain in the press until poured out, instead of scattering around. This will be more cleanly than the other form.

I claim as my invention—

1. In combination with the cylinder of a fruit and jelly press, and the handle C, the latch G, substantially as and for the purpose described.

2. In combination with a screw and follower, A, and handle C, the handle-socket D and projection $d$, to prevent the handles twisting when the follower is screwed down, substantially as set forth.

3. In combination with the perforated bottom F and strainer E, the lugs $f\,f$ and turned-down piece $e$, substantially as specified.

4. A follower or pressure-head in form of an inverted frustum, substantially as and for the purpose described.

5. The cup-shaped follower A, substantially as and for the purpose described.

6. The expansible nut B, in combination with its socket and the projections $b\,b$ on the nut, each and the whole substantially as set forth.

HENRY NADERMANN.

Witnesses:
JEREMIAH F. TWOHIG,
WM. JAS. BATES.